2,893,979

REDUCED POLYMERS OF METHACROLEIN

Earl C. Chapin and Raymond I. Longley, Jr., Springfield, Mass., assignors to Monsanto Chemical Company, St. Louis, Mo., a corporation of Delaware No Drawing. Application November 14, 1955
Serial No. 546,774

5 Claims. (Cl. 260—73)

This invention relates to new resinous materials suitable for use in the preparation of surface coatings. More particularly the invention relates to hydrogenated copolymers of methacrolein and a vinylidene aromatic compound.

In the field of surface coatings it has been found that substantially no materials are available which can be used as the sole film-forming ingredient of surface coating compositions. Alkyd resins, phenolic resins, melamine resins, shellac, etc. all have many good qualities as film formers but must be modified with other resinous materials to produce superior films.

One object of this invention is to provide a new resinous material suitable for incorporating in surface coating compositions.

Another object of this invention is to provide hydrogenated copolymers of methacrolein and a vinylidene aromatic compound.

A further object is to provide a process for hydrogenating copolymers of vinylidene aromatic compounds and methacrolein.

These and other objects are attained by hydrogenating under mild conditions a low molecular weight copolymer of methacrolein and a vinylidene aromatic compound.

In the following examples, parts are parts by weight.

*Example I*

Dissolve 100 parts of a copolymer of methacrolein and styrene having a molecular weight of less than 10,000 and a methacrolein content of about 50% by weight in about 900 parts of tetrahydrofurane. Add the solution rapidly with agitation to a solution of 120 parts of lithium aluminum hydride in about 500 parts of tetrahydrofurane. Then add about 280 parts of diethyl ether and maintain the reaction mixture under reflux temperature at atmospheric pressure for about 16 hours. Now add a 10% aqueous solution of sulfuric acid until the salts formed during the reaction dissolve. The organic materials separate from the inorganic materials and water, and can be removed by decantation. Distill off the ether and tetrahydrofurane from the organic portion at temperatures up to about 190° C. under a vacuum of about 1 mm. of mercury. The product is a clear, brittle resin soluble in organic solvents. Infrared analysis shows that all of the aldehyde groups are reduced to alcohol groups. The reduced product may be easily pulverized and incorporated in surface coating compositions. It improves the gloss and hardness of the films prepared therefrom. If the base resin of the surface coating composition contains groups capable of reacting with hydroxyl groups formed by the hydrogenation reaction, the cured films have greatly increased chemical and particularly alkali resistance.

*Example II*

Dissolve 150 parts of a copolymer of methacrolein and styrene having a molecular weight of <10,000 and a methacrolein content of about 50 mol percent in 500 ml. of tetrahydrofuran. Charge the solution with 50 g. of commercial Raney nickel catalyst to an autoclave equipped with a stirrer and pressure seal. Add hydrogen to 1500 p.s.i. and heat the contents at 170–180° with stirring for three hours. The product is filtered to remove catalyst and the resulting solution is heated to remove solvent. Stripping is completed under 1 mm. pressure at 180°. The residue is an almost water clear, hard, brittle resin about 80% reduced as indicated by its infrared spectrum.

The copolymers of this invention are copolymers of methacrolein with a vinylidene aromatic compound, said copolymers having a molecular weight of from 700 to 10,000 and having from 20–60% by weight of methacrolein chemically combined therein. The copolymers may be made by copolymerizing the methacrolein with the vinylidene aromatic compound at temperatures of 140–250° C. under autogenous pressure in a closed pressure resistant vessel as more fully disclosed in my copending application, Serial No. 546,773, filed November 14, 1955. The vinylidene aromatic compound may be styrene, alpha methyl styrene, o-, m-, or p-methyl styrene, alpha methyl para methyl styrene, or mixtures thereof.

The hydrogenation process is carried out in solution in an organic medium inert to the hydrogenation reaction such as the tetrahydrofurane-ether mixture of Example I under pressure if necessary to increase the speed of reaction. Other organic solvents or solvent mixtures such as the methyl ether of ethylene glycol, cyclohexane-alcohol mixtures, etc. which dissolve both the copolymer and the hydrogenating medium may be used. The hydrogenation reaction should be carried out under conditions which cause hydrogenation of the aldehyde group in the methacrolein but do not attack the benzene ring of the styrene. No substantial problem arises if the hydrogenation medium is lithium aluminum hydride, lithium hydride or mixtures thereof. The hydrogenation may be carried out with the use of metallic hydrogenation catalysts such as nickel or copper-chromium oxide at super atmospheric pressures in the presence of hydrogen or by other reducing systems such as sodium-methyl isobutyl carbinol or aluminum isopropoxide-isopropyl alcohol systems. The extent of hydrogenation necessary to obtain the advantageous properties of the resins of this invention may vary between 50 and 100%.

After the hydrogenation reaction is complete, the reducing agent is destroyed with water or an acid such as the sulfuric acid shown in Example I or removed by filtration. The hydrogenated copolymer is then recovered from the reaction medium by conventional methods such as vacuum stripping at elevated temperatures.

The hydrogenated copolymers are hard, brittle and clear resins which are soluble in organic media such as alcohols, ketones, tetrahydrofurane etc. They may be used per se in admixture with other resins such as alkyd resins, phenolic resins, melamine resins, urea resins, isocyanate resins etc. in surface coating compositions. When the second resin is so formulated as to have end groups reactive with hydroxyl groups of the copolymer, cured films made therefrom are resistant to chemical attack and particularly to alkalies. The hydrogenated copolymers may also be esterified to produce high molecular weight plasticizers for various types of resins and the plasticizers will not have a tendency to migrate from the plasticized compositions.

The foregoing and particularly the example is illustrative of the products and processes of this invention and it is obvious that many variations may be made therein within the spirit and scope of this invention.

What is claimed is:

1. A hydrogenated copolymer of methacrolein and a vinylidene aromatic compound of the group consisting of styrene, alpha-methyl styrene, o-, m-, and p-methyl styrenes, alpha-methyl-p-methyl styrene, and mixtures thereof, said hydrogenated copolymer having been prepared by subjecting a tetrahydrofurane-soluble copolymer of methacrolein and the vinylidene aromatic compound to the action of a reducing agent capable of reducing aldehyde groups to alcoholic hydroxyl groups under mild conditions in an organic solvent inert to the hydrogenation reaction to hydrogenate the copolymer only at the aldehyde groups, said tetrahydrofurane-soluble copolymer having a molecular weight of 700–10,000 and a combined methacrolein content of 20–60% by weight and having been prepared by subjecting a reaction mixture to temperatures of 140–250° C. under autogenous pressure and then removing low-boiling by-products, said reaction mixture being a member of the group consisting of: (a) a mixture consisting of 20–80 parts by weight of methacrolein and, correspondingly, 80–20 parts by weight of the vinylidene aromatic compound, (b) a mixture consisting of 100 parts by weight of (a) and 20–80 parts by weight of an aromatic hydrocarbon solvent, (c) a mixture consisting of (a) and a catalytic amount of a free radical-producing catalyst, and (d) a mixture consisting of (b) and a catalytic amount of a free radical-producing catalyst.

2. A hydrogenated copolymer as in claim 1 wherein the vinylidene aromatic compound is styrene.

3. A hydrogenated copolymer as in claim 2 wherein the hydrogenation of the aldehyde groups is 100% complete.

4. A hydrogenated copolymer as in claim 2 wherein the hydrogenation of the aldehyde groups is 80% complete.

5. A process which comprises subjecting a tetrahydrofurane-soluble copolymer of methacrolein and a vinylidene aromatic compound to the action of a reducing agent capable of reducing aldehyde groups to alcoholic hydroxyl groups under mild conditions in an organic solvent inert to the hydrogenation reaction, said tetrahydrofurane-soluble copolymer having a molecular weight of 700–10,000 and a combined methacrolein content of 20–60% by weight and having been prepared by subjecting a reaction mixture to temperatures of 140–250° C. under autogenous pressure and then removing low-boiling by-products, said vinylidene aromatic compound being a member of the group consisting of styrene, alpha-methyl styrene, o-, m-, and p-methyl styrenes, alpha-methyl-p-methyl styrene, and mixtures thereof, said reaction mixture being a member of the group consisting of: (a) a mixture consisting of 20–80 parts by weight of methacrolein and, correspondingly, 80–20 parts by weight of the vinylidene aromatic compound, (b) a mixture consisting of 100 parts by weight of (a) and 20–80 parts by weight of an aromatic hydrocarbon solvent, (c) a mixture consisting of (a) and a catalytic amount of a free radical-producing catalyst, and (d) a mixture consisting of (b) and a catalytic amount of a free radical-producing catalyst.

References Cited in the file of this patent

UNITED STATES PATENTS

| | | |
|---|---|---|
| 2,256,152 | Nutting et al. | Sept. 16, 1941 |
| 2,478,154 | Evans | Aug. 2, 1949 |
| 2,634,256 | Sparks et al. | Apr. 7, 1953 |
| 2,651,624 | Swart | Sept. 8, 1953 |
| 2,657,192 | Miller et al. | Oct. 27, 1953 |